March 28, 1961 E. E. GYANA 2,976,565
MIXING APPARATUS AND METHOD
Filed May 23, 1958 6 Sheets-Sheet 1

INVENTOR.
EUGENE E. GYANA
BY
Charles A. Blank
ATTORNEY

March 28, 1961 E. E. GYANA 2,976,565
MIXING APPARATUS AND METHOD
Filed May 23, 1958 6 Sheets-Sheet 4

INVENTOR.
EUGENE E. GYANA
BY
Charles A. Black
ATTORNEY

INVENTOR.
EUGENE E. GYANA
BY
Charles A. Blank
ATTORNEY

March 28, 1961    E. E. GYANA    2,976,565
MIXING APPARATUS AND METHOD

Filed May 23, 1958    6 Sheets-Sheet 6

INVENTOR.
EUGENE E. GYANA
BY
Charles A. Blank
ATTORNEY

United States Patent Office 2,976,565
Patented Mar. 28, 1961

2,976,565

MIXING APPARATUS AND METHOD

Eugene E. Gyana, Flower Hill, N.Y., assignor to United States Rubber Company, New York, N.Y., a corporation of New Jersey Filed May 23, 1958, Ser. No. 737,243

15 Claims. (Cl. 18—2)

This invention is for the methods and apparatus herein disclosed and particularly pointed out in the appended claims.

The exact nature of the invention will become fully apparent from a detailed description of the embodiments of the machine selected for disclosure herein and the explanation of the methods which can be performed thereby.

Such machine is illustrated in detail in the accompanying drawings, in which.

The herein-described invention relates to an improved apparatus for and method of mixing plastic materials. As employed herein, the term "plastic materials" is intended to include materials which are rubber or plastic or both and the like. More particularly, the invention relates to mixing apparatus capable of achieving uniformly blended continuous mixing and selective control over the intensity and time of the mixing operation.

A conventional mixing mill consists essentially of two rolls parallel to each other with their longitudinal axes in the horizontal plane, supported in journal bearings fixed in a suitable frame structure, and rotating in opposite directions, convergently as viewed from above.

Conventional mixing is a batch process. The mill is charged with a suitable quantity of stock and mixing is accomplished by repeatedly passing it through the nip formed by a relatively small separation of the rolls. On passing through the nip the stock forms a sheet on the front or working roll which rotates at a slower speed than the back or feed roll. The differential in speed between front and back rolls causes the stock to shear as it is forced through the nip. The surface of the sheet adjacent to the back roll is caused to move faster, by friction, than the surface adjacent the slower moving front roll. Mixing is the result of many repeated shears.

A rolling bank of the stock forms in the convergence of the rolls, directly above the nip, as mixing proceeds. The size of the rolling bank is relatively small and is dependent on the physical characteristics of the stock. Beyond an optimum size it cannot be increased. Additional stock on the mill, in excess of an optimum rolling bank, remains static and is not subjected to mixing. Ordinarily, it is necessary that an operator regularly cut the sheet off the front roll to allow additional stock from the rolling bank to pass through the nip in order to activate the static mass. This procedure must be repeated many times before the ingredients of the batch are completely mixed and the desired physical properties developed. The quality of the mixed stock is entirely dependent on an operator. There is no assurance that, even with the most skilled and experienced operator, the batch is thoroughly mixed and uniformly blended.

Mixing on a conventional mill is confined to a very small portion of the roll surface. It is limited to the tangential zone at the nip and the portion in contact with the rolling bank, a relatively few degrees of arc. The sheeted stock on the roll, from the instant it emerges from the nip until it re-enters at the rolling bank, is inactive.

The mixing action on a conventional mill is unidirectional. Circumferential filaments of the revolving sheet of stock pass through the rolling bank and the nip with little or no immediate blending with adjacent filaments. It requires the attention of an operator to cut the sheet from the roll and re-orient the direction of the filaments for adequate blending, by putting the sheet on the rolling bank for repassage through the nip.

Laminar flow of the stock through the rolling bank and the nip is another characteristic of the conventional mixing mill. This phenomenon is particularly apparent when pigments are being mixed with the stock. After repeated passes through the rolling bank and the nip the outer surface of the sheet shows every indication of complete mixing while the surface of the sheet adjacent the roll shows undispersed color streaks.

It is frequently necessary to strip a continuous narrow ribbon of stock from the mill to feed another processing machine such as a calender or a tuber. The continuous stripping causes a local depletion of the rolling bank. The void is filled, unpredictably, either directly from the static mass directly over it or by a longitudinal flow of the rolling bank. A particle of stock may pass directly from the static mass to the stripped ribbon or may linger to the last in the active rolling bank. In other words, the resident time of any particle on the mill is uncertain.

The degree or intensity of mixing is equivalent to the amount of energy or power absorbed by the stock. The rate of power input to a conventional mixing mill varies with the physical properties of the stock and for any one stock reaches a maximum when the rolling bank is of optimum size. Beyond this point additional available power is of no consequence. The degree of mixing is a function of time, the only controllable variable in conventional mixing operations. To increase the degree of mixing, the mixing time must be correspondingly extended.

Various types of apparatus have previously been proposed in attempts to improve the mixing action of a mill. For example, one type of apparatus utilizes mixing rolls having circumferential grooves of appreciable depth. The grooves weaken the rolls and render the apparatus more complex and expensive than is desirable for many applications. Moreover, whatever mixing might take place is local because adjacent strands of rubber are isolated in almost totally enclosed grooves making commingling impossible.

Another prior apparatus employs a series of knives and plows positioned over the working rolls to cut the rubber into strips and to turn each strip over and form it into a roll which is drawn endwise into the bite. While cutting the rubber into strips and rolling it on itself may improve the mixing to some extent, it does not eliminate both laminar and filamental flow. That is, there is no reorientation of the circumferential filaments along non-circumferential lines.

It is apparent from the foregoing description that a conventional mixing mill is not efficient and that the quality of the mixed stock produced on it is variable. The primary objects of my invention are to improve the quality of the mixed stock, to increase the intensity of the mixing action, and to increase the efficiency and versatility of a mixing mill. Apparatus in accordance with my invention, by lifting the sheeted stock from the roll and reorienting and rolling it continuously at a multiplicity of points as it re-enters the rolling bank and the nip, creates a continuous blending of adjacent filaments and lamina, resulting in great quality improvement. Furthermore, apparatus in accordance with my invention, by increasing the intensity of the mixing action improves the dispersion of agglomerated powders such as pigments, carbon black, sulphur, accelerators, etc., usually added to plastic mixtures, resulting in further substantial improvement in quality. Also, by virtue of the intensified mixing action, the time required for the mixing operation is greatly reduced, thereby greatly increasing the efficiency and the productive output of the mill.

In practicing my invention, use is made of a device by means of which the mixing action is intensified; the sheet formed on the front roll is continuously re-oriented; and the stock is advanced continuously and uniformly from the feed end of the mill to the discharge end. The device is a reorientation member or bar of approximately wedge shaped cross section, extending over the length of the rolls, positioned with its apex pointing in the nip, and supported in a structure secured at each end to the mill frame. The surface of the reorientation bar facing the front roll is concave and divergent with the roll surface. Spaced at suitable intervals on the front surface of the reorientation bar are a series of helically pitched flights conforming to and concentric with the roll contour, forming in appearance a partial internal screw with a decreasing thread height. The leading or entering end of each flight is beveled to a knife edge, the bevel typically facing in the direction of the stock advancement. The surface of the reorientation bar facing the back roll is also concave, but less divergent with the roll surface than the front face and is devoid of flights.

The reorientation bar is adjustable vertically, horizontally parallel to the front roll, and angularly. Vertical adjustment is by means of two adjusting screws secured at one end to a structural member spanning the mill and supported on the mill frames and at the other end to the bar. Horizontal and angular adjustments are made by means of floating gibs positioned by opposing screws. These adjustments make possible a setting most suitable for the degree of mixing and advancement required for a particular stock by controlling the profile or the clearance between the flights and the front roll. When the bar is positioned with the flights concentric with the roll and separated from it by a minimum space, the degree of mixing and rate of stock advancement is at a maximum. Some stocks require a lower degree of mixing than others. This is accomplished by raising the bar by means of the adjusting screws to increase the clearance between the flights and the roll surface. The greater the space between the flights and the roll surface, the lesser will be the rate of axial advancement because of slippage and the lesser the reorientation of the sheet on the front roll as it enters the rolling bank because the cutting edge of the flight is raised in varying degrees above the roll surface and conceivably above the level of the sheet. When the bar is withdrawn entirely from the nip the mill functions in the conventional manner. The rate of advancement, and consequently the productive output of the mill, may be retarded with no sacrifice in mixing quality by canting the bar, by means of the adjustable gibs, in various degrees so that the leading edge of the flights remain in close proximity to the roll while the apex of the bar is somewhat remote from it. In this position the helical flights are only partially effective in advancing the stock, but the stock reorienting function of the leading edge of the flight remains unchanged. It may be seen, therefore, that it is possible to achieve any desired degree of mixing intensity. Mixing time is controlled by introducing the stock to be mixed at some intermediate point on the mill. Since the stock is uniformly advanced in one direction only, the mixing time is proportional to the distance the stock travels on the mill.

In operating my invention, plastic stock (preferably in a continuous strip—however the stock may, for example, be in the form of pellets or irregular lumps) is fed to the charging end of the mill. The stock enters the cavity formed by the concave surface of the bar and the convex surface of the roll between the end flight and the first helically inclined flight. The stock passes through the nip formed by the separation of the rolls and bands on the front roll. As feeding continues, a rolling bank develops above the nip, and it continues to increase until the cavity is filled. The convergence formed by the concave bar surface and the convex roll surface constitutes an entering wedge which causes a hydrodynamic pressure build-up as the stock is pulled, by surface friction and adherence, into the apex of the convergence. As the roll rotates, the stock adjacent the roll surface is subjected to a shearing force, due to the high friction between the stock and the roll surface and the adhesion of stock to the roll surface, tending to drag the stock into the convergence. As the convergence narrows, a consequent pressure increase occurs, reaching a maximum in the zone where the apex of the bar is at its closest proximity to the front roll. The point of closest proximity directly above the nip. The pressure build-up, which is greatly in excess of the pressures existing on a conventional mill, results in: (a) an extrusion of the stock through the nip at a high velocity, causing a homogenizing action (a certain amount of extrusion occurs on a conventional mill due to the speed differential between front and back roll; the hydrodynamic pressure build-up in the convergence greatly increases the extrusion); (b) a reverse flow, away from the nip, along the concave surface of the bar to be repeatedly sheared and re-dragged into the convergence of the wedge; (c) a high state of turbulence with attendant shear and consequent break-down of "nerve" and improvement in plasticity.

Simultaneously with the filling of the first cavity the band of stock on the front roll is increasing in width until it exceeds the flight spacing. At this point the sharp bevel on the leading edge of the first helical flight slices the band and diverts the excess to the second cavity. This process continues until the second cavity is filled and the band width again exceeds the flight spacing when the beveled edge of the second helical flight cuts the band, diverting the excess to the third cavity. This continues until the last cavity is filled. When the last cavity is filled, a continuous strip of stock is cut from the front roll at a rate equal to the feed rate. In this manner a balanced and continuous mixing operation is maintained.

As the banded stock on the front roll is cut by the sharp edge of a helical flight, that portion of the sheet on the advancing side of the flight is lifted from the roll and is coiled on itself and turned through an angle of approximately 90 degrees, resulting in a complete and continuous reorientation of stock flow before the sheet re-enters the turbulent mixing zone. That is, filaments along the circumference of the roll are turned to assume a non-circumferential position and lie approximately longitudinally of the rolls after reorientation. As the stock is advanced axially, due to the helical pitch of the flight, the stock is intercepted by each succeeding flight and is repeatedly completely and continuously reoriented. Continuous reorientation is greatly desirable in that it eliminates laminar and filamental flow.

The combined result of reorientation, high pressure extrusion through the nip, increased turbulence and shear in the mixing zone, and continual blending, is a mixed stock of greater homogeneousness with a greatly improved dispersion of agglomerated particles; and since these functions are performed continuously and automatically, great economies in operation are effected.

Another use for my invention is the continuous mixing of compounding materials such as carbon black, sulphur, accelerators, fillers, resins, waxes, oils, etc., with rubber or plastics. For this purpose suitable hoppers are arranged at convenient locations to introduce the admixture into the rolling bank. Mixing need not be limited to one mill only. It may be desirable to extend the mixing operation over several mills in series. To accomplish this a strip from the discharge end of the first mill is conveyed to the charging end of the second mill and so on.

Figure 1:
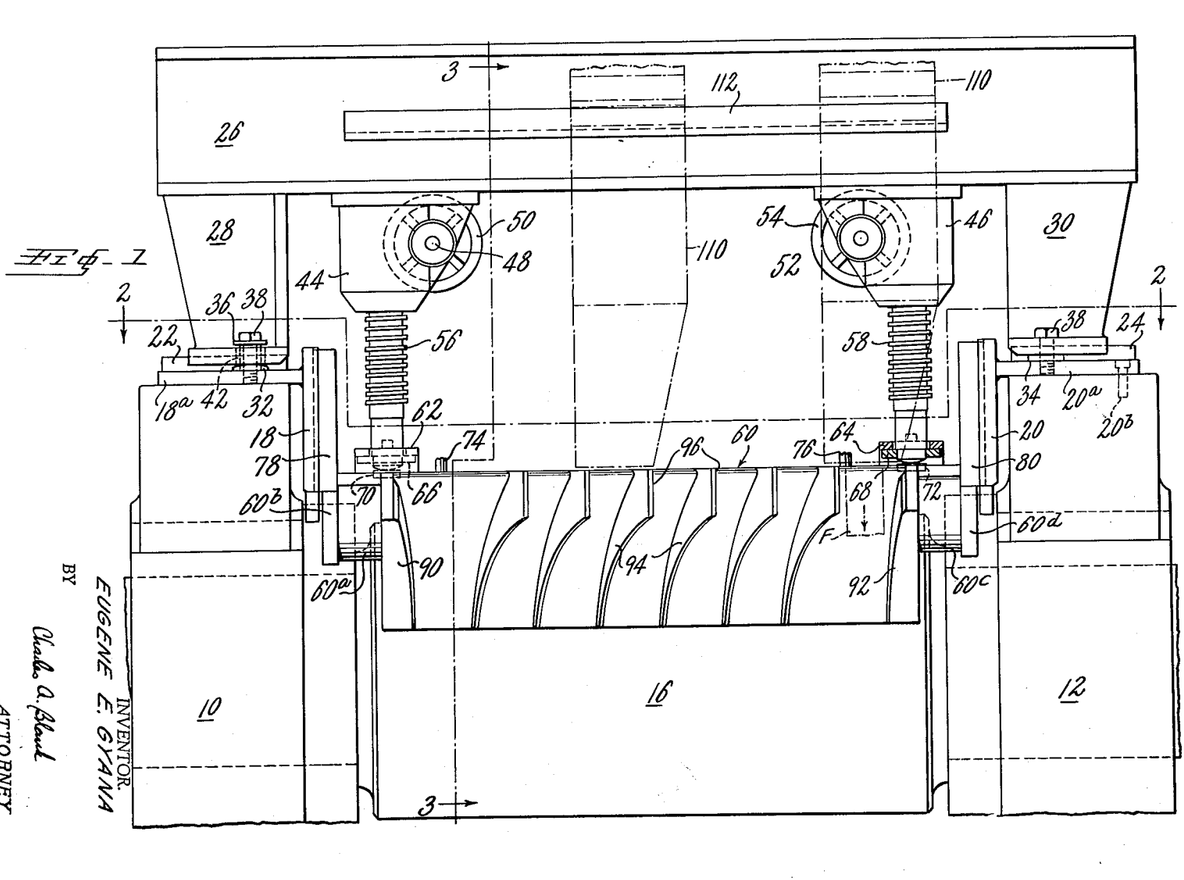
Figure 1 is a front elevational view with some parts removed and some parts in cross section of a mixing mill in accordance with this invention.
Figure 2:
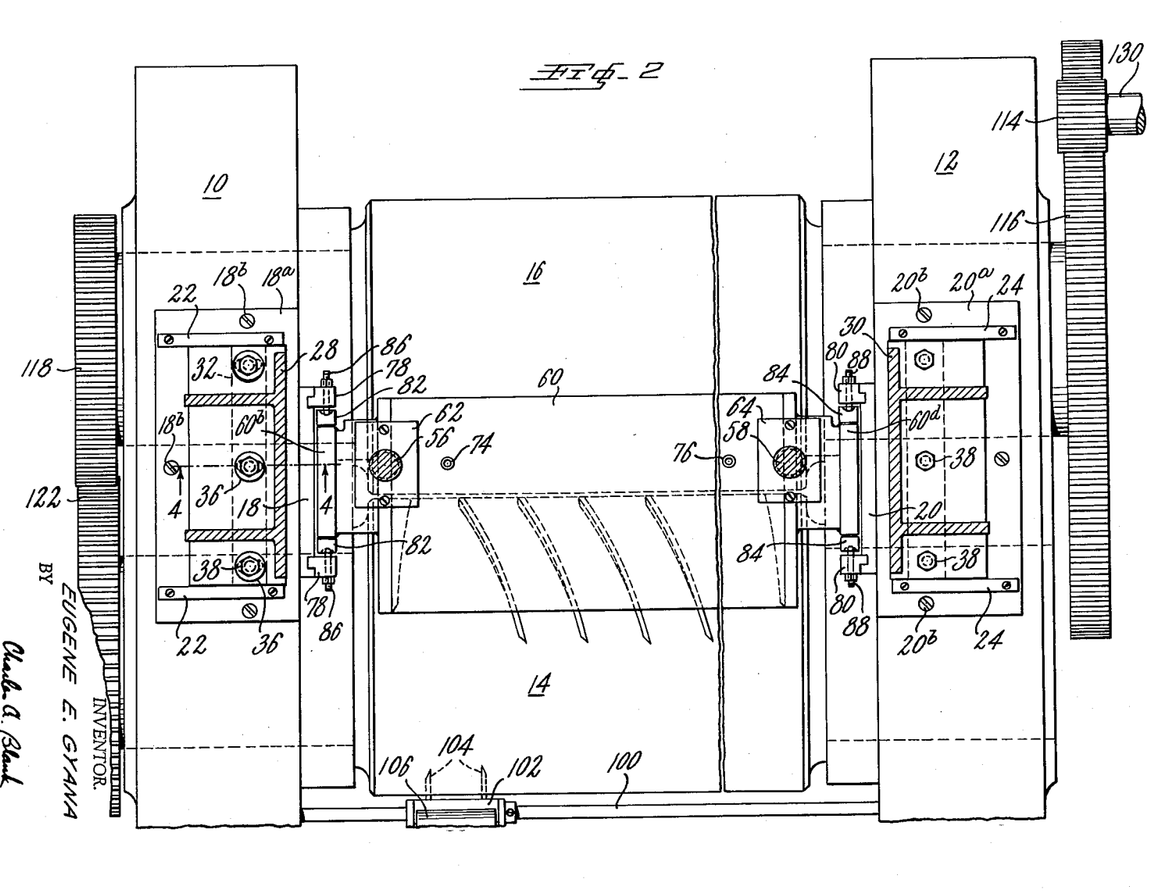
Figure 2 is a horizontal, cross-sectional view of the apparatus taken on the line 2—2 of Fig. 1, showing in addition to the disclosure in Fig. 1, the power drive for the apparatus.
Figure 3:
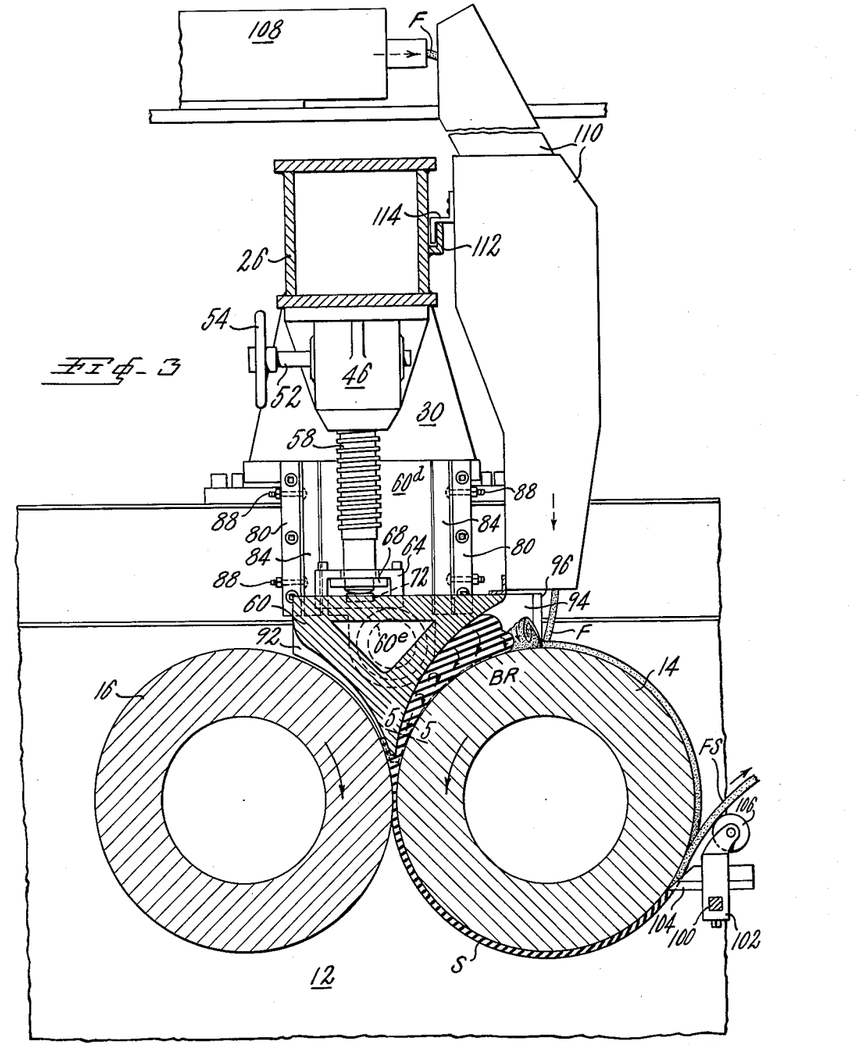
Figure 3 is a vertical, cross-sectional view taken on the line 3—3 of Fig. 1.

As represented in the drawings, the machine comprises a pair of end frame members or standards 10 and 12 (Fig. 1) of the required bulk and of a configuration suited to the purpose, in which are journaled on a pair of integral hubs at their respective ends a pair of rollers 14 and 16 (Fig. 2). These rollers are rotatably mounted on axes which are parallel and are closely spaced as illustrated in Fig. 3, to form a nip which in effect is a trough of the same length of the rollers and of generally V-shaped form in cross section. The sides of the channel are arcuate since they are formed by the oppositely situated faces of the rolls.

A pair of guide plates 18 and 20, which have lateral plate-like extensions 18ᵃ and 20ᵃ respectively, are mounted on the top surfaces of the standards 10 and 12 respectively. They are secured thereto by means of machine screws 18ᵇ and 20ᵇ, see Figs. 1 and 2. The guide plates extend vertically so as to lie parallel to the end faces of the rolls, as clearly illustrated in Fig. 1. Secured on the top faces of the extensions 18ᵃ and 20ᵃ in parallel spaced relation are pairs of positioning bars 22 and 24 between which lie respectively the bases of pedestals 28 and 30, which in turn support a transverse box girder 26 on their upper ends. The girder 26 extends above and between the end frame members 10 and 12 lying parallel to the axes of the rolls 14 and 16.

Figure 4:
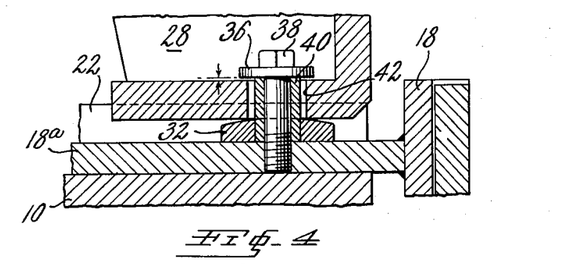
Figure 4 is a detailed, cross-sectional view, to an enlarged scale, taken on the line 4—4 of Fig. 2.

Interposed between the bases of the pedestals 28 and 30 and the plate-like extensions 18ᵃ and 20ᵃ are a pair of bars 32 and 34 which have curved upper surfaces, as is most clearly seen in Fig. 4. The feet of the pedestals have a series of apertures 42 through which headed bolts 38 pass and which are threadedly mounted in the lateral extensions 18ᵃ and 20ᵃ of the guides 18 and 20. A sleeve 40 surrounds each of the bolts 38 in the frame member 10 and its external diameter is smaller than the diameter of the bores 42 to provide clearance therebetween, as clearly shown in Fig. 4. Also, the length of the sleeve 40 is precisely determined so as to provide a slight clearance between the heads of the bolts and the adjacent surface of the feet of the pedestals. This slight clearance is of the order of two thousandths of an inch. When the bolts 38 in the frame member 10 are pulled up tight they seat on the upper ends of the sleeves 40 which extend through the bar 32 so as to maintain the slight clearance referred to. The bolts 38 in the frame member 12 preferably rigidly attached the pedestal 30 to the frame member 12.

With this arrangement the pedestals are able to move slightly in all directions in a horizontal plane and to rock on the curved upper surface of the bar 32 to relieve the stresses which are transmitted into the overhead structure, comprising the pedestals 28 and 30 and rigidly cross connected box girder 26, which arise from the reaction of the working of the mix on the reorientation bar, as will appear as the description proceeds.

Secured on the end surface of the girder 26 in spaced relation so as to lie in vertical planes adjacent the ends of the rolls are a pair of fixtures 44 and 46 in which are journaled horizontal shafts 48 and 52 having accessible hand wheels 50 and 54. Within the fixtures 44 and 46 which form housings are rotatable nuts which have worm-wheel teeth on their peripheries (not shown) which engage with worms (not shown) on the respective shafts 48 and 52. The rotatable nuts engage the vertically extending threaded shafts 56 and 58 which are provided at their lower ends with discs 66 and 68, respectively engaging the end surface of U-shaped brackets 62 and 64. These brackets are secured to the upper face of the reorientation bar 60, see Fig. 3, so that the bar is supported by the threaded shafts 56 and 58. The lower ends of these shafts are rounded and hardened and engage respectively hardened buttons 70 and 72 mounted in the top surface of the bar. This bar is hollow, forming a chamber 60ᵉ, Fig. 3, having the inlet and outlet connections 74 and 76, see Figs. 1 and 2, and for the heating medium such as hot water or steam or for cooling water.

The reorientation bar 60 is provided at its ends with axially aligned extensions 60ᵃ and 60ᶜ. Welded or otherwise secured to the ends of the extensions 60ᵃ and 60ᶜ are a pair of generally rectangular plates 60ᵇ and 60ᵈ respectively. These plates are confined between gibs 82 and 84, see Figs. 2 and 3, which gibs can be adjusted as to position transversely and rotationally of the axis of the reorientation bar, and as to parallelism by pairs of adjustable thrust screws 86 and 88. These screws are threadedly mounted in bars 78 and 80 which are secured in parallel relation to the front faces of the guide plates 18 and 20 respectively. It will be apparent that by adjusting the thrust screws 86 and 88 the gibs 82 and 84 can be shifted transversely of the axes of the rolls and can be rotated in their vertical planes so that the reorientation bar 60 can be shifted, for example, forwardly and rearwardly of the rolls, and can be adjusted angularly (canted) on a horizontal axis, so as to perform important functions which will be described later.

Figure 7:
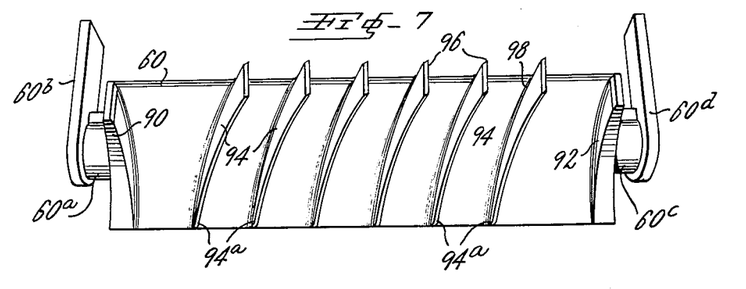
Figure 7 is a front elevational view of the reorientation member showing the helical flights which cause axial movement of the mix.

As will be best seen in Fig. 7, the reorientation bar is provided at its ends with end walls 90 and 92 which extend forwardly and rearwardly of the bar, see also Fig. 3. As is clear from the drawings, the front faces and rear end faces of the end walls are of arcuate form on a radii the same as the radii of the rolls 14 and 16 to form in effect end walls for the V-shaped trough at the nip of the rolls.

Figure 5:
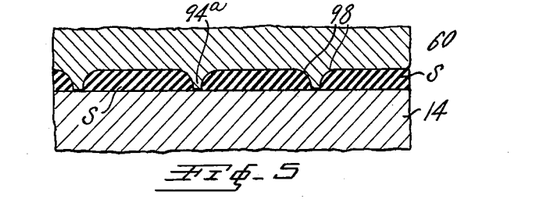
Figure 5 is another detailed view in cross section taken on the line 5—5 of Fig. 3.

As is clear from the various figures, the reorientation bar is generally of triangular form in cross-section and its two side faces are arcuate in cross-section. Neither face is concentric with the rolls 14 and 16 but the front face, which cooperates with the roll 14, is shaped and relatively positioned so as to form a channel longitudinally of the roll, which is generally V-shaped, with its convergent end extending into the nip of the rolls. Mounted on this face are a series of ribs or flights 94 which extend helically with respect to the axis of the roll 14. These flights are joined along their rear edges, see Figs. 5 and 7, to the reorientation bar and their side surfaces flow into the adjacent face of the reorientation bar along curved lines. To state it another way, fillets are formed between the adjacent faces of the flights and the reorientation bar as clearly shown at 98 in Fig. 5. The flights 94 extend beyond the forwardmost edge of the reorientation bar, see Figs. 3 and 7, and terminate in sharp cutting edges 96. The exposed or edge faces of the flights are curved and the flights are of decreasing width from the cutting edges to their opposite ends where, as shown at 94a, they are of minimum width. These exposed edges of the flights are generally concentric with the roll 14. As illustrated in Fig. 7 the flights are equally spaced longitudinally of the reorientation bar in this form of the device, and can be considered as sections of an internal helical screw.

As shown in Figs. 2 and 3, extending in front of the roll 14, between the end members 10 and 12, is a support bar 100 shown in rectangular cross-section, on which is positionable a carriage 102. This carriage is provided with a pair of spaced knives extending towards the roll 14 and terminating in cutting edges. Journaled on this carriage is a guide roller 106. In a more refined form of the device the knives 104 can be adjustably mounted on the carriage 102 to provide for different spacings for a purpose which will become apparent later. The carriage 102 can be secured to the support bar 110 at various points along its length.

As diagrammatically illustrated in Fig. 3, the supply source for a mill of this type might, for example, be an extruder 108 of any suitable form which supplies the feed stock F to the mill through a hopper assembly 110. As illustrated, this hopper assembly is provided with a bracket 114 engageable with and supported by a fixture 112 attached to and extending along the front face of the girder 26, see also Fig. 1. As indicated in Fig. 1, this hopper can be positioned at various points along the rolls or several such hoppers may be provided. As will appear later, these hoppers are illustrative also of other forms of hoppers by means of which various additives for the mix or stock can be supplied for blending purposes.

As illustrated in Fig. 2, the rolls 14 and 16 are caused to rotate in opposite directions and are power driven. One way they may be driven is by means of a shaft 130 operated from any suitable power source, not shown. This shaft is provided with a drive gear 114 which meshes with a driven gear 116 mounted on the adjacent end of the hub extension of the roll 16. The opposite hub extension of this roll is provided with a gear 118 which is a driving gear for the gear 122 secured on the adjacent hub extension of the roll 14. As would be well understood in this art, the front roll 14 preferably is rotated more slowly than the rear roll 16, so that gear 122 is proportionately larger in diameter than its driving gear 118.

As explained at the beginning of this disclosure the stock is supplied to the mill from the extruder 108. This feed F, as illustrated, may be in the form of a band of extruded material which is guided by the hopper 110 onto the top surface of the front roll 114, which is rotating in a counterclockwise direction, as viewed in Fig. 3. Thus the material comprising the feed is carried towards the nip of the rolls. The hopper 110 when the full capability of the mill is being utilized, will be positioned at the righthand end of the rolls, see Fig. 1, so that the feed enters between the end plate 92 and the most righthand positioned flight 94. This feed accumulates in a rolling bank RB, see Figs. 3 and 8, and is gradually drawn down into the nip of the front and back rolls at their righthand end, where it is mixed and worked in the usual manner for a mill of this general type. The rolling bank which forms in the nip of the rolls gradually works downwardly towards the apex of the nip trough where it is subjected to a working and shearing action which causes its ingredients to be worked and blended. Ultimately it forms a sheet S on the surface of the front roll 14. As the material is drawn into the convergence formed by the front face of the reorientation bar 60 and the roll 14, it is subjected to a build-up in pressure and to shearing forces, and is extruded through the nip of the rolls, causing an intense homogenizing action. As is clear from Fig. 3, the sheet S which forms in and issues from the nip, increases to a greater thickness, at least for some materials, than that represented by the minimum spacing between the rolls because of the high pressure build-up in the convergence and the resulting high rate of extrusion through the nip. The material forms as a sheet on the front roll for reasons well-known in the art. For example, the slower speed of the front roll may cause the sheet to form on it. Some stocks are influenced by the temperature difference between the rolls. The speed ratio between the rolls remaining unchanged, some stocks will follow the hotter roll while others will follow the colder one. It is also possible that the stock may have a tendency to follow neither roll; in this event the stock must be trained manually to follow the front roll.

Mixing results from shearing forces which are generated not only because of the differential surface speeds of the rolls, but also as a result of the speed ratio between the moving surface of the front roll and the stationary face of the reorientation bar, and also as a result of the continuous reorientation and turbulence of the stock in the convergence.

Figure 8:
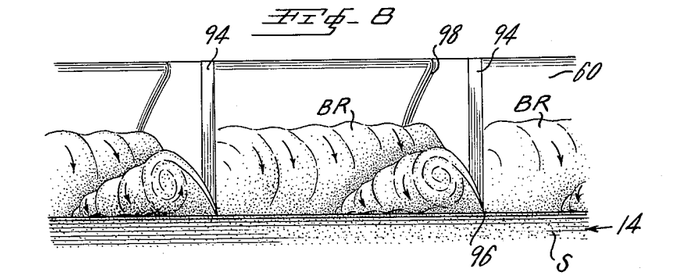
Figure 8 is an enlarged, detail, front view showing the relationship of the reorientation member of Fig. 7 with the front roll of the mill and diagrammatically illustrating the effects of the helical flights and the cutting action performed at their front ends.

As the action proceeds the sheet on the surface of the front roll between the first flight and the end wall 92 of the reorientation bar spreads out axially towards the left, Fig. 2, until the cutting edge 96 of the first flight is engaged thereby, whereupon, as illustrated in Fig. 8, the knife begins to shear the sheet and to deflect the excess amount into a rolling bank RB between it and the next flight. In Fig. 8 is illustrated a very important action of the mill herein disclosed, as distinguished from the conventional mill in that the sheeted material as it is cut is caused to roll upon itself and to be gradually deflected through an angle of 90 degrees, which action is enhanced by the curvature 98 of the cooperating surfaces of the flights and the front face of the bar. As a result, instead of the particles of the mix moving circumferentially around with the roll in a plane substantially at 90 degrees to the axis of the roll any individual particle by reason of this orientation is moved out of that plane axially. That is, rolled strips of stock are turned into a plane substantially parallel to the axes of the mill rolls. This eliminates what might be termed striation and it even insures, because of the repetition of these orientations at each flight, a thorough blending of the contents of the mix. In the conventional mill if a colored powder is introduced into the roll bank it will in general still be apparent in the finished mix as streaks or strips of color normally indicating the lack of thorough mixing. With the mill of this invention, this result does not occur, and the color is thoroughly distributed in the mix and completely disappears unless present in sufficient amount to uniformly color the stock.

It will be seen, by considering Fig. 8, the cutting of the sheet at the knife edges 96 and the stripping of it from the roll, followed by reorientation through 90 degrees that as the mix is delivered from the resulting rolling bank back into the nip that the ingredients of the mass will be completely and thoroughly distributed and redistributed in the mix, producing a homogeneous product.

This action repeats itself at each of the blades so that the stock is repeatedly sheared, extruded and reoriented to the end that when the final product in the form of the strip FS is removed from the roll at its discharge end, that is at the knives 104, it will be an extremely well mixed and uniform product.

Under some operating conditions, double rolls of material between flights are not apparent but the reorientation of filaments nevertheless occurs in the manner previously described and a single roll axially disposed between flights is apparent.

As diagrammatically illustrated in Fig. 1, the supply hopper 110 can be positioned over the reorientation bar at various points longitudinally thereof to vary the point of introduction of additive and the uniformity of mixing thereof that will occur in the mill. Alternatively, Fig. 1 suggests that the feed strip could be introduced at the righthand end of the roll and some other ingredient or ingredients introduced into the mix at some spaced point along the bar. This possibility will be discussed in further detail below.

Consideration will now be given to the adjustments which may be imparted to the bar. By rotating the hand wheels 50 and 54 the bar may be bodily raised or lowered in the nip of the rolls so as to bring the apex of the bar further away from or closer to the vertex of the nip. The rotation of the hand wheels causes the nuts, not shown, to revolve, thus either raising or lowering the bar through their reaction on the threaded rods 56 and 58. By raising the bar a sufficient distance to render it inactive, the mill becomes an ordinary conventional mixing mill. On the other hand, by moving the bar further into the nip the intensity of mixing and the rate of advancement of the stock along the roll can be increased. Some stocks require lower and some require higher degrees of mixing and this is accomplished by raising or lowering the bar respectively, thereby increasing or decreasing the clearance between the bar and its helical flights and the roll surface. The higher the bar the lower the rate of axial advancement of the stock along the roll due to slippage, and likewise there will be a lesser reorientation of the sheet as the cut strips reenter the rolling bank.

The rate of advancement of the stock and consequently the output of the mill can be retarded without sacrificing mixing quality by canting the bar by means of the adjustable gibs 82 and 84. By means of this adjustment in combination with the vertical adjustment of the bar, the lead edges of the flights can be kept in close proximity to the front roll surface while the apex of the bar in the nip can be moved towards or away from the roll. As the apex is moved away from the front roll the helical flights are rendered less and less effective in advancing the stock but reorientation thereof remains unchanged. More particularly, as the apex of the bar is moved away from the front roll, the helical flights are disengaged from the roll surface, thereby allowing the stock to slip axially through the intervening space. If the bar is canted to open the clearance at the apex, but the leading edges of the flights remain in contact with the roll, the cutting and turning action previously described remains unchanged.

Conversely if the apex is brought closer to the front roll and the leading edges of the flights are moved away from it, the mixing intensity remains the same but the rate of stock feed is reduced, increasing the time that it takes a unit of stock to move through the mill. Thus, in addition to increasing the intensity of mixing the time length of mixing can be increased.

It will be understood, of course, that the operation of the machine is not limited to feeding the stock thereto in the form of the strip F since the mill could be fed with, for example, pellets or lumps of charging stock.

The above description of operation comprises a more generalized summary of the operation of the mill than the more concise and detailed description thereof set forth at the beginning of this disclosure.

Figure 9:
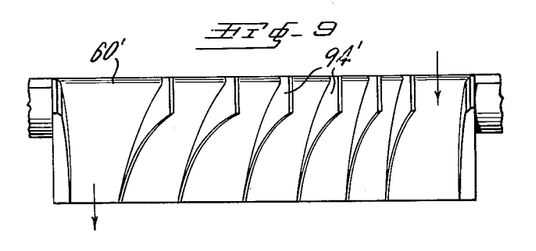
Figure 9 is a view similar to Fig. 7 distinguished therefrom in that in the latter the flights are spaced equidistantly in an axial direction, whereas in the former they are of gradually increasing spacing.
Figure 10:
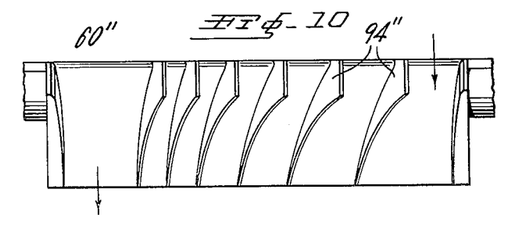
Figure 10 is a view similar to Fig. 9, showing an opposite arrangement of the flights in that they are of decreasing spacing in the same axial direction.

Figs. 9 and 10 illustrate two variations in the construction of the reorientation bar to suggest possible variations within the scope of this invention without departure from its substance. In the arrangement of Fig. 9 the reorientation of the stock is repeated at increasingly long intervals towards the left because the flights 94' are of increasing spacing. The converse is true in the case of the structure of Fig. 10 in which the spacing of the flights is of decreasing spacing towards the left of the roll.

Figure 6:
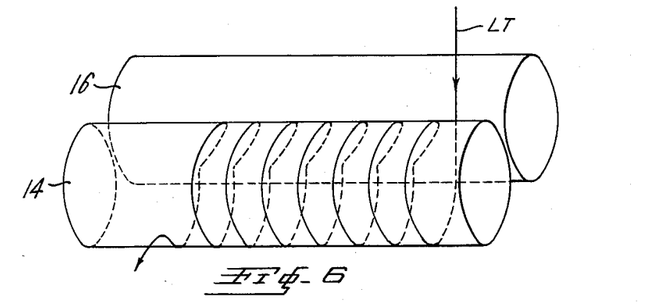
Figure 6 is a diagrammatic view illustrating the continuous axial travel of a mix through the mill of this invention.

Fig. 6 is a diagrammatic illustration of the path of travel of a unit or a particle of a mix illustrating the manner, which should be apparent in view of the foregoing description, in which the stock is caused to gradually advance from the supply to the discharge end.

From the above description it will be apparent that the mill of this invention provides a continuous method of mixing materials, suitable to combining in this manner, without the constant supervision and judgment of the operator. When the reorientation bar is adjusted properly for a particular composition, it will be seen that succeeding quantities thereof will follow through the mill and be subjected to substantial and constant and uniform mixing to the end that a desired uniform finished product comes out of the exit end.

Moreover, a more efficient use of power is effected and in the overall operation a better product results with a much lower power input as compared with the total power input required in repetitive, interrupted mixing operations of conventional rubber-processing equipment.

Figure 11:
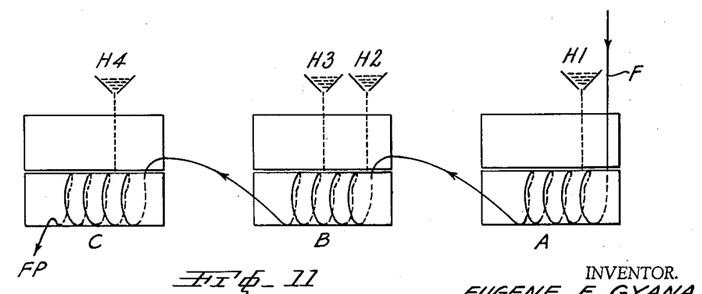
Figure 11 is a diagrammatic illustration, showing the progress of a mix through several machines in accordance with this invention to provide a continuous process in which various additives may be successively introduced into the mix.

Fig. 11 illustrates a continuous mixing and blending operation which it is now possible to set up with two or more machines in accordance with this invention to produce an overall continuous process by which various stocks may be mixed and have blended therewith various additives commonly required in this art, depending upon the uses to which the finished products are to be put. As illustrated for example, the feed F from any suitable source will enter at the righthand end of mill A and will progress axially therethrough. At a point therealong some suitable additive can be introduced into the rolling bank at a particular point by means of the hopper H1. The product of this mill can then be guided to and introduced into the feed end of a similar mill B, where at a point of introduction and at a later point, by way of example, other additives can be introduced into the mix by means of the hoppers H2 and H3. Finally, in continuance of this operation the output of the mill B can be introduced into a similar mill C, where further mixing and blending can occur and still another additive can be introduced at a desired point by means of the hopper H4. The final product of this continuous operation is represented by the output FP, then ready for final use. It is apparent that this assembly can be operated continuously and independently of an operator's judgment based upon pre-planned requirements, to the end that an extremely uniform homogeneous final product results.

As suggested earlier, the spacing between the knives 104 can be adjusted to produce an output strip of the desired width. Likewise, the carriage 102 can position the knives at their points along the rolls to take the product off at a later or earlier point. It should also be noted that the stock may be fed to the mill at any desired point, thus selectively controlling the mixing time with no adjustment of the progression bar or the knives. (It is not particularly desirable to control the mixing time by stripping at an intermediate point because there is an invariable over-run that would accumulate at the discharge end of the mill.)

Figure 12:
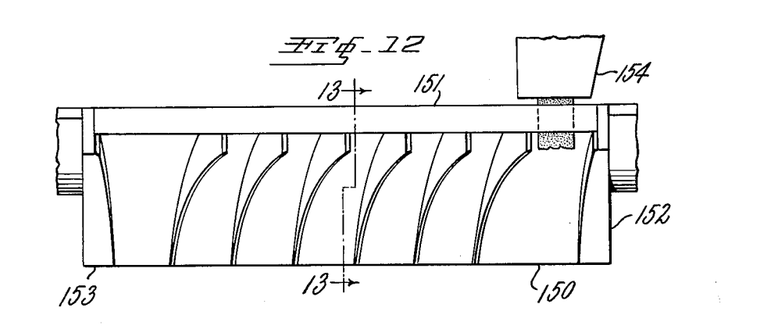
Figure 12 is a front elevational view of a modified form of reorientation bar including a shroud-like portion.
Figure 13:
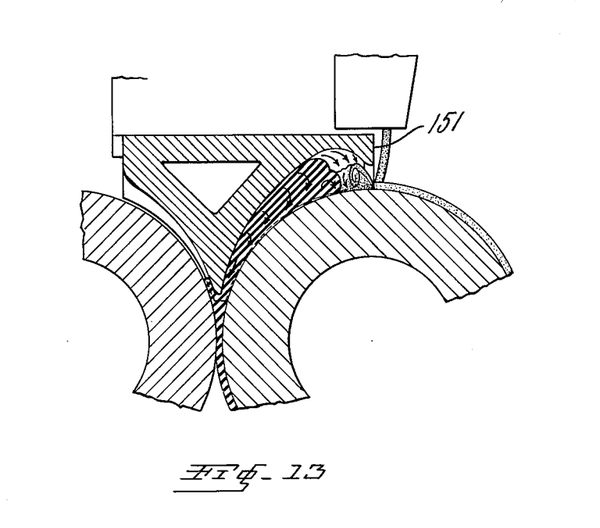
Figure 13 is a cross-sectional view taken on line 13—13 of Fig. 12 showing the reorientation bar in relation to the mixing rolls.

Referring now more particularly to Figs. 12 and 13, the reorientation bar 150 there represented may be similar to the reorientation bar 60 of the Fig. 1 embodiment with the exception that a shroud-like portion 151 extends along the length of the bar between the end walls 152 and 153. Certain stocks are sufficiently stiff as they rise to the upper edge of the rolling bank, represented in Fig. 13, that it is necessary to guide the stock downward into the roll to prevent the development of a static mass at the upper edge of the rolling bank. The shroud 151 is effective to direct the rising stock downward into the rolling bank to assure that there is no static mass developed. The shroud 151 is particularly useful at the region of the bar near the feeding means 154 where there is a greater tendency to develop a static mass.

From the above description it will be apparent to those skilled in the art that there is disclosed herein methods and apparatus by means of which the continuous mixing and blending of stocks, suited to such processing, can be effected. The intensity and time of mixing is readily controlled and the introduction of additives is simply effected at appropriate points in the process.

A very important aspect of this invention is that a continuous operation is commercially possible and most important of all, independent of an operator's judgment and experience. By proper planning and adjustment of the parts, a continuously uniform resultant product can be produced in which the ingredients are more thoroughly blended than has heretofore been possible with conventional mills. All of these advantages are accomplished with a lower total power input as compared with the total power input required by greater number of conventional mills and mixes ordinarily employed in rubber-processing equipment.

It will be at once apparent to those skilled in the art that considerable variation in the details of procedure and in the construction of the apparatus are possible while employing the basic subject matter of this invention. It is desired that the disclosure be taken as illustrative of the invention rather than limitative thereof. It is preferable, therefore, that the scope of protection afforded hereby be determined primarily by the appended claims.

Having thus described my invention, what I claim and desire to protect by Letters Patent is:

1. A mill for mixing plastic material comprising a pair of mixing rolls journaled for rotation in closely spaced relation; means for rotating said rolls convergently; and means comprising a progression member extending longitudinally of said rolls and positioned near the nip of said rolls and having longitudinally spaced helical flights on the face of the member adjacent the material-carrying roll for cutting the material on said material carrying roll and for reorienting circumferential filaments along non-circumferential lines to form a rolling bank of material progressing longitudinally of the rolls, said progression member and said material-carrying roll having non-concentric curved faces forming a converging entering channel for the material causing a hydrodynamic pressure build-up in the material as it approaches the nip, whereby improved mixing action is provided.

2. A mill for mixing plastic material comprising a pair of mixing rolls journaled for rotation in closely spaced relation; means for rotating said rolls convergently; and means comprising a progression member extending longitudinally of said rolls and positioned in the nip of said rolls with the apex of said member near the apex of the nip and having longitudinally spaced helical flights on the face of said member adjacent the material-carrying roll for cutting the material on said material-carrying roll and for reorienting circumferential filaments along non-circumferential lines to form a rolling bank of material progressing longitudinally of said rolls, said progression member and said material-carrying roll having non-concentric curved faces forming, in conjunction with said flights, converging entering wedge-shaped channels for the material causing a hydrodynamic pressure build-up in the material as it approaches the nip, whereby improved mixing action is provided.

3. A mill in accordance with claim 2 including means for adjustably positioning said progression member in the nip of said rolls.

4. In the combination of claim 2, said flights each having a shearing edge on their leading ends.

5. In the combination of claim 2, said progression member having end plates lying in planes at right angles to the axes of said rolls and adjacent the ends thereof.

6. In the combination of claim 2, means for feeding stock into the nip of said rolls at any desired point longitudinally therealong.

7. In the combination of claim 2, said progression member being hollow and means for supplying a temperature-controlling medium to and exhausting it from said progression member.

8. In the combination of claim 3, said positioning means including means for canting said progression member in the nip of said rolls to adjust the spacing of said flights with respect to said front roll.

9. A method of mixing plastic stock which comprises continuously feeding the stock into the nip at a point between a pair of closely spaced rolls moving in the same direction at the nip on parallel axes, applying an axial force to the stock to advance it longitudinally of the rolls from the feed point, shearing the sheet into strips, rolling the strips on themselves and moving them into a plane substantially parallel to the axes of the rolls, separately feeding the rolled strips into the nip and continuously removing the finished stock at a point longitudinally spaced from the feed point.

10. In the method of claim 9, the additional step of feeding an additive into the stock at a desired point along the roll nip.

11. In the method of claim 9, the additional step of controlling the temperature of the stock during mixing.

12. A mill for mixing plastic material comprising a pair of mixing rolls journaled for rotation in closely spaced relation; means for rotating said rolls convergently; and means comprising a progression member extending longitudinally of said rolls and wedge-shaped in cross section and positioned in the nip of said rolls with the apex of said member near the apex of the nip and having longitudinally spaced helical flights on the face of said member adjacent the material-carrying roll for cutting the material on said material-carrying roll and for reorienting circumferential filaments along non-circumferential lines to form a rolling bank of material progressing longitudinally of said rolls, said progression member and the said material-carrying roll having non-concentric faces forming, in conjunction with said flights, converging entering wedge-shaped channels for the material, said flights being effective to shear the stock on said material-carrying roll and to lift it therefrom, and said progression member being effective to turn the lifted stock substantially into a plane parallel to the axis of said material-carrying roll and to cause a hydrodynamic pressure build-up in the material as it approaches the nip, whereby improved mixing action is provided.

13. A mill for mixing plastic material comprising a pair of mixing rolls journaled for rotation in closely spaced relation; means for rotating said rolls convergently; and means comprising a progression bar extending longitudinally of said rolls and positioned at the nip of said rolls and having longitudinally spaced helical flights on the face of the bar adjacent the material-carrying roll for cutting the material on said material-carrying roll and for reorienting circumferential filaments along non-circumferential lines to form a rolling bank of material progressing longitudinally of said rolls, said face of said bar being concave and being non-concentric with the face of said material-carrying roll and forming therewith a converging entering wedge-shaped channel for the material causing a hydrodynamic pressure build-up in the material as it approaches the nip, whereby improved mixing action is provided.

14. A mill in accordance with claim 13 in which the surfaces of said flights and said face of said bar are joined by curved surfaces.

15. A mill for mixing plastic material comprising a pair of mixing rolls journaled for rotation in closely spaced relation; means for rotating said rolls convergently; and means comprising a progression bar extending longitudinally of said rolls and wedge-shaped in cross-section and positioned in the nip of said rolls with the apex of said bar near the apex of the nip and having longitudinally spaced helical flights on the face of said bar adjacent said material-carrying roll, the face of said bar being concave and the edges of said flights adjacent said material-carrying roll being substantially concentric therewith and the leading ends of said flights having knife formations for cutting the material on said material-carrying roll, said bar being effective to turn the lifted stocks substantially into a plane parallel to the axis of said roll, said progression member and said material-carrying roll having non-concentric curved faces forming, in conjunction with said flights, converging entering wedge-shaped channels for the material causing a hydrodynamic pressure build-up in the material as it approaches the nip, whereby improved mixing action is provided.

References Cited in the file of this patent

UNITED STATES PATENTS

| | | |
|---|---|---|
| 616,434 | Coulter | Dec. 20, 1898 |
| 1,930,736 | Burrell | Oct. 17, 1933 |
| 2,625,709 | Schareer | Jan. 20, 1953 |
| 2,663,901 | Hale et al. | Dec. 29, 1953 |
| 2,730,755 | Hale et al. | Jan. 12, 1956 |

FOREIGN PATENTS

| | | |
|---|---|---|
| 17,145 | Great Britain | 1896 |